(12) United States Patent
Espe

(10) Patent No.: US 10,773,481 B2
(45) Date of Patent: Sep. 15, 2020

(54) SINGLE OR MULTI-LEVEL HOT PRESS AND USE OF THE SAME

(71) Applicant: HUECK Rheinische GmbH, Viersen (DE)

(72) Inventor: Rolf Espe, Bochum (DE)

(73) Assignee: HUECK Rheinische GmbH, Viersen (DE)

( * ) Notice: Subject to any disclaimer, the term of this patent is extended or adjusted under 35 U.S.C. 154(b) by 291 days.

(21) Appl. No.: 15/942,534

(22) Filed: Apr. 1, 2018

(65) Prior Publication Data

US 2018/0236740 A1 Aug. 23, 2018

Related U.S. Application Data

(63) Continuation of application No. PCT/EP2016/073406, filed on Sep. 30, 2018.

(30) Foreign Application Priority Data

Oct. 2, 2015 (DE) .................... 20 2015 006 923 U

(51) Int. Cl.
B32B 37/00 (2006.01)
B30B 15/06 (2006.01)
B32B 37/10 (2006.01)

(52) U.S. Cl.
CPC .......... B30B 15/061 (2013.01); B30B 15/064 (2013.01); *B32B 37/10* (2013.01)

(58) Field of Classification Search
CPC ............................ B30B 15/061; B30B 15/064

USPC ...................................................... 156/583.1
See application file for complete search history.

(56) References Cited

U.S. PATENT DOCUMENTS

| | | | | |
|---|---|---|---|---|
| 5,298,322 A | * | 3/1994 | Hennecken | ........... B30B 15/061 442/229 |
| 6,780,280 B2 | * | 8/2004 | Halterbeck | ........... B30B 15/061 100/295 |
| 7,897,527 B2 | * | 3/2011 | Yoshida | ................ B30B 15/061 442/224 |
| 9,108,378 B2 | * | 8/2015 | Douglas | ................ B30B 15/061 |
| 2005/0001351 A1 | | 1/2005 | Yoshida | |

FOREIGN PATENT DOCUMENTS

| | | |
|---|---|---|
| DE | 2319593 B | 11/1974 |
| DE | 9017587 U1 | 3/1991 |
| DE | 2627442 A1 | 12/1997 |

(Continued)

*Primary Examiner* — James D Sells
(74) *Attorney, Agent, or Firm* — Von Rohrscheidt Patents

(57) ABSTRACT

A single or multi-level hot press including at least one heat plate; at least one press plate; and at least one press pad arranged between the heat plate (8) and the press plate, wherein the at least one press pad a carrier material provided as a metal fabric and a pad layer made from a FKM rubber material, wherein the at least one press pad is introduced into the single or multi-level hot press in a condition where the pad layer includes a partially cross linked or a partially vulcanized FKM rubber material, and wherein a final cross linking or final vulcanization of the at least one press pad is performed in the single or multi-level hot press under pressure and temperature between the heat plate and the press plate so that the press pad is able to adapt to properties of the press arrangement.

4 Claims, 1 Drawing Sheet

(56) References Cited

FOREIGN PATENT DOCUMENTS

| | | |
|---|---|---|
| DE | 102005027073 A1 | 12/2006 |
| DE | 102013100433 A1 | 7/2014 |
| DE | 102013015677 | 3/2015 |
| EP | 0713762 | 5/1996 |
| EP | 0725948 B1 | 8/1996 |
| EP | 1300235 B1 | 4/2003 |

* cited by examiner

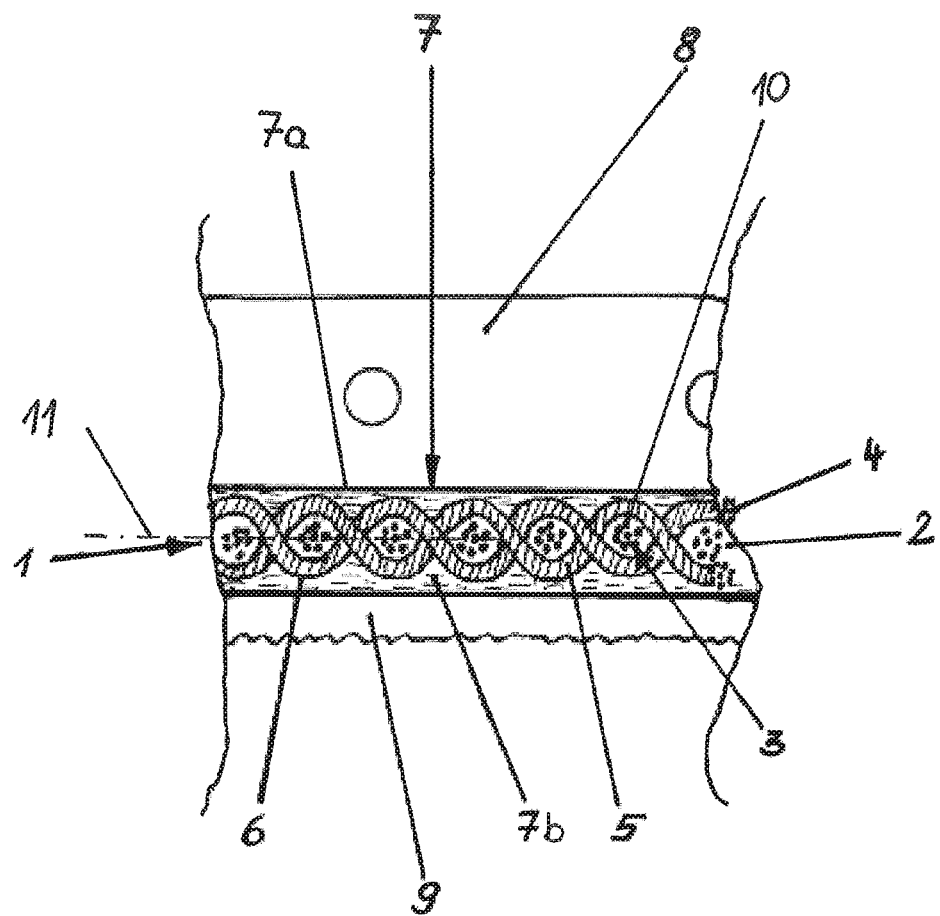

SINGLE OR MULTI-LEVEL HOT PRESS AND USE OF THE SAME

RELATED APPLICATIONS

This application is a Continuation of International Application PCT/EP2016/073406 filed on Sep. 30, 2016 which claims priority from German Patent Application DE 20 2015 006 923.1 filed on Oct. 2, 2015, both of which are incorporated in their entirety by this reference.

FIELD OF THE INVENTION

The invention relates to a single- or multi-level hot press including at least one heat plate, at least one press plate and at least one press pad that is arranged between the heat plate and the press plate and which includes a carrier material configured as a metal fabric and a pad layer made from a FKM natural rubber material.

The invention furthermore relates to a press pad for the hydraulic single or multi-level hot press described supra.

The invention furthermore relates to a method for producing a press pad for a single or multi-level hot press including at least one heat plate and a press plate wherein the press pad is arranged between the heat plate and the press plate and includes a carrier material configured as a metal fabric and a pad layer made from a FKM natural rubber material.

The invention furthermore relates to a use of a press pad that includes a carrier material configured as a metal fabric and a pad layer made from a FKM natural rubber material wherein the pad layer is provided in a condition so that the FKM natural rubber material is partially cross linked or partially vulcanized.

BACKGROUND OF THE INVENTION

Press pads of this type can be used in different press arrangements, e.g. in multi-level presses with high pressure or in one level short cycle pressed with low pressure. The multi-level presses are typically used for producing synthetic material laminates made from plural paper layers which are infused with duro plastic resins under high specific pressing pressures. The multilevel presses are also used to coat particle boards or MDF or HDF plates under low pressing pressures with imprinted decorative single color craft papers that are also infused with duro plastic resins. The coating of the particle boards, MDF or HDF plates with synthetic resin films, however, is typically performed in single level presses or so called short cycle presses. The name short cycle press stands for rather short press times under pressure and temperature wherein deforming the plate material is performed in a hot condition.

The high alpha pulp papers that are infused with melamine-/formaldehyde condensation resins form solid and irreversible surfaces under pressure and temperature and thus assume a surface structure and a gloss level of metal press plates used. The press pads perform an important function when coating wood material plates with duro plastic resin films since no void free surfaces can be formed otherwise. The press pads provide even pressure distribution and a constant temperature flow. During coating in the press the duro plastic resins are initially meltable with low viscosity and flow capable and then cross link into a non-dissolvable unmeltable, hard and abrasion resistant synthetic material. This type of cross linking of the synthetic material is designated as poly condensation wherein water and formaldehyde are generated. The water generated during the condensation reaction and the formaldehyde cannot be released in vapor form since the higher pressing pressure which is above the vapor pressure of the water presses the two gaseous products into the film layer and into the carrier plate, this means the wood material. Therefore a pressing pressure is required that is uniform over an entire surface of the material to be coated. This function is performed by the press pads.

The press pads have to withstand the high temperatures that are provided in the press arrangements. Furthermore the press pads have to conduct heat quickly from the heat plate to the press plate and subsequently to the surface of the material to be pressed. Furthermore the press pads have to withstand the high pressing pressure without losing their pad properties, this means reset properties or even being destroyed.

In the press arrangements typically geometric or dimensional imperfections are provided in that the heat plates and/or the press plates are respectively not oriented exactly parallel to each other and their surfaces are not exactly flat. In case of larger deviations from the ideal geometric constellation (completely parallel orientation and flatness of the surfaces of press plates and heat pads) special pads are required which have variable thickness along their surface in order to able to compensate dimensional deviations in the press.

Press pads are typically textile fabrics that are provided with different materials and which have uniform thickness over their entire surface. In practical applications different embodiments are provided which can only partially satisfy the requirements of the respective press arrangement.

A press pad according to DEB-23 19593 includes a metal fabric which is completely coated with a non-cross linked silicone resin provided as an elastomeric material, wherein curing or cross linking is performed after coating in a drying channel and the respective surfaces have to be coated separately in a complex process.

DE 90 17 587 U1 describes a press pad which includes a flexible pad fabric that is made from an aromatic polyamide yarn and mixed with other yarn materials. With respect to a total weight of the press pad the textile fabric shall include metal threads at a rate between 0% by weight and 70% by weight so that the heat conductivity can be set to a required value.

EP 0 713 762 A2 discloses a press pad for high pressure presses and low pressure presses wherein the press pad includes various materials, e.g. yarn from a aromatic polyamide with metal threads, metal threads, heat resistant filament made from rubber or a rubber mix, heat resistant filament made from silicone or silicone mixes and their mixes with and without metal threads.

The press pad according to EP 0 725 948 B1 includes warp threads and/or weft threads which include a silicone elastomeric material which can be included in the fabric for example in a form of solid threads or in a form of metal wire that is enveloped by silicone.

Furthermore a similar press pad is known from EP 1 136 248 A1, wherein the fabric includes a substantial portion of a fluor elastomeric material and/or a silicone fluor elastomeric material. Thus, it is alternatively provided that the fabric includes a substantial portion of a blend elastomeric material which is produced by cross linking a mix made from a silicone rubber and a fluor rubber or from a silicone fluor rubber. The described elastomeric materials are thus configured as a thread material and woven into a fabric which includes interlinked warp threads or weft threads that are configured as metal threads.

EP 1 300 235 B1 describes a press pad which includes a textile carrier with threads wherein at least a portion of the threads forms heat conducting threads which cause a heat transfer from an outside of the press pad to another outside of the press pad either directly or through a contact with other heat conducting threads, wherein the carrier includes a pad layer made from an elastic rubber material in the portion of the intersecting threads. The known press pad is characterized in that a thickness of the pad layer is less than a thickness of the carrier and the pad layer is embedded into the carrier so that the heat conducting threads protrude beyond the pad layer on outsides of the press pad.

It is furthermore described that the pad layer is introduced into the textile fabric by a coating process.

Furthermore EP 1 300 235 B1 discloses that the two sided protrusion of the heat conducting threads beyond the pad layer generates a direct surface contact under the pressing pressure with the heat plates and with the press plates. This substantially accelerates heat transfer. It has become apparent under the aspect of the press and resin technology that press pads of this type with uniform fabric thickness cause problems when forming the surface of the thermosetting resin. Especially when producing floor tiles from high density fiber board (HDF) with raw thickness of 800 kg/m$^3$ to 1000 kg/m$^3$ press pads are required which are configured specifically for the press arrangement. This means that press pads of this type if necessary have different heat transfer coefficients over their surface on the one hand side and a different cushioning effect over their surface on the other hand side.

All previously described press pads have in common that they are produced on corresponding weaving machines and in case of DE-B-23 19 593 and EP 1 300 235 are subsequently coated with a pad material that is coatable while uncured. This means that the known press pads include a pad thickness that is constant over an entire pad surface and which can only be adapted to technical properties of the press arrangement within limits. In particular an adaptation to an individual geometric situation of a respective press arrangement is hardly possible. In press arrangements with different thickness tolerances over the surface the known press pads are deformed differently so that pressing pressures imparted onto the press plate and the press material over the surface of the press pad are different. As a consequence there is premature pad wear and a low quality surface at the coated pressing material.

It is another disadvantage of the known press pads that they are attached in the press arrangement, this means in particular at the heating plates or the press plates. Typically known press pads are fixed in the press arrangements with complex clamping devices. Thus, the press pads are subjected to very high mechanical tensions. This frequently leads to premature fabric wear, in particular for the so called top pads. Press plates are exchanged quite frequently in the press arrangements due to different surfaces that are required to form the surfaces of the thermosetting resins. Thus, the pads typically remain fixated in the arrangements. However, due to the weight of the pads substantial sagging of the pads occurs especially in the so called top plate.

When the press plates are inserted into the press arrangement again quite frequently the press pads are damaged mechanically and depending on the severity of the damage they have to be replaced with new press pads. This causes a high consumption of press pads, wherein a continued use of damaged press pads causes surface voids of the coated wood particle boards.

BRIEF SUMMARY OF THE INVENTION

Thus, it is an object of the invention to provide a single level or multi-level hot press, a method for producing a press pad for the press and a press pad for the press which can also comply with more stringent requirements in innovative press applications. In particular, a longer service life of the press pads shall be achieved as well as an adaptation to individual dimensional or geometric properties of the respective press. Furthermore it is desirable to simplify a fixation of the press pad in the single level or multi-level hot press.

Improving upon a single or multi-level hot press of the type described supra the object is achieved according to the invention in that the press pad is introduced in a condition into the single level or multi-level hot press wherein the pad layer includes a partially cross linked or partially vulcanized FKM rubber material and the final cross linking or final vulcanization of the press pad is performed in the single level or multi-level hot press under pressure and temperature between the heat plate and the press plate. Thus, the press pad can be adapted to the instant conditions, in particular the individual dimensional and geometric situation of the press arrangement.

The object is achieved by A single or multi-level hot press including at least one heat plate; at least one press plate; and at least one press pad arranged between the heat plate and the press plate, wherein the at least one press pad a carrier material provided as a metal fabric and a pad layer made from a FKM rubber material, wherein the at least one press pad is introduced into the single or multi-level hot press in a condition where the pad layer includes a partially cross linked or a partially vulcanized FKM rubber material, and wherein a final cross linking or final vulcanization of the at least one press pad is performed in the single or multi-level hot press under pressure and temperature between the heat plate and the press plate so that the press pad is able to adapt to properties of the press arrangement.

The object is also achieved by a method for producing a press pad for a single or multi-level hot press, the single or multi-level hot press including at least one heat plate, at least one press plate, and at least one press pad arranged between the heat plate and the press plate (9), wherein the at least one press pad includes a carrier material provided as a metal fabric and a pad layer made from a FKM rubber material, the method comprising the steps: introducing the press pad into the single or multi-level hot press in a condition where the pad layer includes a partially cross linked or a partially vulcanized FKM rubber material, and performing a final cross linking or final vulcanization of the press pad in the single or multi-level hot press under pressure and temperature between the heat plate and the press plate so that the press pad is able to adapt to properties of the press arrangement.

The object is also achieved by a method of using a press pad that includes a carrier material provided as a metal fabric and a pad layer made from a FKM rubber material, the method comprising the steps: providing the pad layer of the press pad in a condition where the FKM rubber material is partially cross linked or a partially vulcanized, introducing the press pad partially cross linked or partially vulcanized into a single level or multi level hot press between a heat plate and a press plate, performing final cross linking or final vulcanization of the press pad in the single or multi-level hot press under pressure and temperature between the heat plate and the press plate so that the press pad is able to adapt to properties of the press arrangement.

The object is also achieved by a press pad configured for single level or multi-level hot presses, the press pad including a metal fabric configured as a carrier material and a pad layer made from an FKM rubber material, wherein the pad layer includes a partially cross linked or partially vulcanized fluor rubber material before production of the press pad and a final cross linking or final vulcanization of the press pad is performed in a respective press arrangement under pressure and temperature between a heat plate and a press plate so that the press pad is adaptable to properties of the press arrangement and fixed at the heat plate or the press plate.

Thus, the pad layer is initially only made from partially cross linked or partially vulcanized fluor rubber in particular FKM according to DIN-1629 and ASTM D 1418 when the press pad is delivered by the manufacturer. In this form the press pad is not suitable for use in a press arrangement. Furthermore the inner core layer of the press pad is made from a metal wire fabric in order to assure a high level of heat transmission. The final production of the press pad is thus provided according to the invention only in the respective press arrangement, thus not at the fabrication site of the manufacturer but the press pad is only completed at the customer site. The press pad according to the invention is custom made for the respective press arrangement and therefore only usable in this press arrangement and only usable in the respective position, e.g. top pad or bottom pad. Since the fluor rubber is initially only partially cross linked final cross linking or vulcanizing is performed under pressure and temperature in the respective press arrangement. Thus, typically normal pressure and temperature values can be reached that are typical for the respective press arrangements. Deviations from these values in upward direction or downward direction are also possible if necessary for the cross linking or vulcanizing process. Typically no production coating process is performed in the press when the final cross linking or vulcanization of the press pad is performed. This means no pressing material is in the press. However, it is also conceivable to use a dummy material between the opposite press plates in order to provide even pressure distribution and to prevent a contact of the press plates with one another.

The partially cross linked or partially vulcanized FKM rubber material is flowable under pressure and temperature, however it has a viscosity under room temperature so that the FKM rubber material can be handled together with the central metal fabric in the form of an upper layer and a lower layer without any problem and the press pad can be introduced as a unit or sandwich into the press arrangement. During the final cross linking process or final vulcanization under pressure and temperature the FKM rubber material can flow horizontally in zones in which opposite press plates are further remote from each other than in other portions. This way more of the pad layer is formed in the zones, this means overall a thicker press pad is generated. These press pad properties with varying thickness is particularly important for the subsequent coating of the wood material plates in order to achieve uniform pressure distribution and thus a high surface quality.

Since the FKM rubber material has good adhesion at metals an adhesion layer can be formed towards the heat plate or the press plate during final cross linking or final vulcanization in the press arrangement. Depending on particular requirements the formed press pad can be fixated together with the press plate directly at the heat plate or by a separation foil between the press plate and the press pad so that the press pad is only fixated at the heat plate. The metal fabric of the press pad can be arranged between an upper elastomeric layer and a lower elastomeric layer configured as FKM foil, this means the metal fabric can be arranged at this location and connects with the elastomeric layers during the cross linking or vulcanization process in the press arrangement.

When forming the melamine resin surfaces more and more difficult embossing structures are used which do not only have to emboss the melamine resin layer itself but partially also the top layer of the HDF plates. The short press cycle times that are common today cause resin flow interferences in combination with different thickness tolerances and associated pressing pressures over the surface of the press which then lead to embossing voids in the surfaces. The press pad according to the invention counteracts these circumstances since it compensates the different thickness tolerances within the press system including press pad, and press plate already during production wherein different heat conducting capabilities that may be required can also be considered.

Advantageously the FKM rubber material can be used in a form of plate material or foil material that is arranged on both sides of the subsequently centrally arranged metal fabric (carrier material) and introduced as a packet (sandwich) into the press arrangement. This way the production process is simplified considerably.

Using FKM rubber material in the press pad according to the invention provides extremely high long term temperature resistance which is above all currently used pressing temperatures. Also during continuous use there is no decomposition of the FKM rubber material which occurs for example in silicone elastomeric materials where de-polymerization can occur when air is excluded. Once the de-polymerization starts it is also associated with a degradation of mechanical strength, in particular the shore hardness is affected which determines a cushioning effect of a press pad.

The FKM rubber material can be cross linked or vulcanized in different ways. A known method is diaminic cross linking which is often used because of the good adhesion between elastomeric materials made from the rubber and metals. A more modern cross linking method is the bisphenolic mechanism, also designated as dihydroxy mechanism where bisphenol AF and a quaternal phosphonium salt are used as cross linker components. This is a nucleophilic substitution mechanism. Compared to diaminic cross linking, better resistances against hydrolysis and higher temperature resistance and an improvement during a pressure deformation test are obtained. Another cross linking type is peroxydic cross linking also designated as triazin method wherein free radicals cause the cross linking. The peroxydic cross linking is particularly important when FKM rubbers are used which include perfluormethylvinylether (PMVE) since the two ionic mechanisms can lead to destruction of the polymer chains by attacking the PMVE. In watery or non-watery electrolytes peroxydic fluor elastomeric materials are superior to products of other cross linking mechanisms. The temperature resistance is similar to bisphenolic cross linked materials.

The metal support fabric in the pads is responsible on the one hand side for the heat transfer from the heat plate of the press arrangement to the press plate and on the other hand side for the ability of the press pad to retain its format (mechanical strength). The heat conductivity of the press pad according to the invention can be provided for example by the thickness of the warp threads or weft threads.

Alternatively or as a supplement thereto by different metal materials with special heat conductivity parameters (copper, brass, bronze, steel, stainless steel, etc.) for the threads.

Furthermore it is also possible according to the invention to produce a heat conductivity for the press pads that differs over the surface of the press pads, this means which differs partially. Thus, warp threads and/or weft threads can vary at a particular location or in a desired portion with respect to their material composition (metal composition) and/or thread strength and/or thread density. This creates zones with different heat transfer rates in the press pad wherein the zones have a positive effect upon the required resin flow of the surfaces to be coated, so that surface voids can be prevented.

In another feature of the invention it is provided that the pad layer in the instant embodiment the FKM rubber material is mixed with a filler with heat conducting properties during production. For this purpose in particular metal powders or metal fibers but also carbon powder or carbon fibers or for example silica sand are suitable. But other materials are also conceivable wherein their heat conductivity should advantageously be greater than the heat conductivity of the pad material. The portion of the heat conducting filler materials is a function of the intended or required heat conductivity parameters of the entire press pad.

If the press pad according to the invention is fixated directly at the heat plate and/or at the press plate the heat flow is reduced for each press cycle compared to the prior art. Namely there are no delays in the heat flow during the open condition of the press arrangement due to air layers between the press pad and the heat plate and/or the press plate but directly after retrieving the coated press material the heat loss in the press plate can be compensated so that the temperatures that are required for the next coating process are available again more quickly. Furthermore the press pads according to the invention do not have any length and/or width shrinkage due to their production in the press arrangement or also no desirable expansion during press operations.

BRIEF DESCRIPTION OF THE DRAWINGS

The invention is now described in more detail based on an embodiment with reference to a drawing FIGURE. The only drawing FIGURE shows a vertical sectional view of a press arrangement that is not illustrated in detail in as far as it is known in the art.

DETAILED DESCRIPTION OF THE INVENTION

The press arrangement includes a heat plate 8, a press pad 1 and a press plate 9. The press pad 1 is arranged in a known manner between the heat plate 8 and the press plate 9, wherein all three recited components are arranged parallel to each other and thus horizontally. Below the press plate 9, the pressing material to be coated is arranged in an operating condition of the single level or multi-level hot press wherein a contoured lower surface of the press plate is oriented towards the pressing material to be coated. The press plate 9 is a so called "top plate" and the press pad 1 is a so called top pad.

The press pad 1 includes a metal fabric as a carrier material 2 wherein the metal fabric is configured in the plain weave. The carrier material 2 includes weft threads 3 that are made from cross linked metal wires 10 that extend orthogonal to the drawing plane. The weft threads 3 are woven together with warp threads 4 and 5 which respectively change sides of the press pad 1 between the weft threads 3 and which respectively form loops 6 above and below the weft threads. A pad layer 7 made from FKM rubber is formed symmetrical to a center plane 11 of the press pad 1. The pad layer 7 is made from an upper pad layer 7a and a lower pad layer 7b which can be bonded together through the carrier material 2. Air inclusions in the press pad 1 are possible in the portion of the carrier material 2, but also a complete freedom from gas in the finished condition. Due to the adhesion properties between the FKM rubber material of the upper pad layer 7a and the metal heat plate 8 the press pad 1 firmly adheres to the metal heat plate 8 so that no additional fixation in the press arrangement is required. The press plate 9 at which the press pad 1 does not adhere because a divider foil was arranged during final cross linking in the press arrangement between the press pad 1 and the press plate 9, wherein the separation foil was subsequently removed, can therefore be easily replaced when a press plate 9 with another embossing structure, this means surface structure is desired. During the exchange process the press pad 1 does not hang down from the heat plate 8.

REFERENCE NUMERALS AND DESIGNATIONS 1 press pad
2 carrier layer
3 weft thread
4 warp thread
5 warp thread
6 loop
7 pad layer
7a upper pad layer
7b lower pad layer
8 heat plate
9 press plate
10 metal wire
11 center plane

What is claimed is:

1. A method for producing a press pad for a single or multi-level hot press, the single or multi-level hot press including
   at least one heat plate,
   at least one press plate, and
   at least one press pad arranged between the heat plate and the press plate (9),
   wherein the at least one press pad includes a carrier material provided as a metal fabric and a pad layer made from a FKM rubber material,
   the method comprising the steps:
   introducing the press pad into the single or multi-level hot press in a condition where the pad layer includes a partially cross linked or a partially vulcanized FKM rubber material; and
   performing a final cross linking or final vulcanization of the press pad in the single or multi-level hot press under pressure and temperature between the heat plate and the press plate so that the press pad is able to adapt to properties of the press arrangement.

2. The method according to claim 1,
   wherein a separation foil is arranged between the press plate and the press pad during final cross linking or vulcanization, and
   wherein the separation foil prevents a fixation of the press pad at the press plate.

3. The method according to claim 1, wherein the pad layer of the press pad is fixated at the heat plate by forming an adhesion layer during final cross linking or final vulcanization.

4. A method of using a press pad that includes a carrier material provided as a metal fabric and a pad layer made from a FKM rubber material, the method comprising the steps:
- providing the pad layer of the press pad in a condition where the FKM rubber material is partially cross linked or a partially vulcanized;
- introducing the press pad partially cross linked or partially vulcanized into a single level or multi level hot press between a heat plate and a press plate; and
- performing final cross linking or final vulcanization of the press pad in the single or multi-level hot press under pressure and temperature between the heat plate and the press plate so that the press pad is able to adapt to properties of the press arrangement.

* * * * *

UNITED STATES PATENT AND TRADEMARK OFFICE
CERTIFICATE OF CORRECTION

PATENT NO. : 10,773,481 B2
APPLICATION NO. : 15/942534
DATED : September 15, 2020
INVENTOR(S) : Rolf Espe It is certified that error appears in the above-identified patent and that said Letters Patent is hereby corrected as shown below:

On the Title Page

Item (63) should read:
Continuation of application No. PCT/EP2016/073406 filed on Sept. 30, 2016

Signed and Sealed this
Third Day of November, 2020

Andrei Iancu
*Director of the United States Patent and Trademark Office*